United States Patent Office 3,427,278
Patented Feb. 11, 1969

3,427,278
PHOTO CHEMICALLY INERT RESINOUS COMPOSITIONS PIGMENTED BY TITANIUM DIOXIDE AND CONTAINING AN INORGANIC NITRATE
Walter T. Siuta, Metuchen, N.J., assignor to National Lead Company, New York, N.Y., a corporation of New Jersey
No Drawing. Filed July 28, 1966, Ser. No. 568,396
U.S. Cl. 260—39                                    4 Claims
Int. Cl. C08g 51/02, 9/10, 9/30

ABSTRACT OF THE DISCLOSURE

This invention covers a new and novel composition of matter comprising a $TiO_2$ pigment, an inorganic nitrate compound and a resinous material selected from the group consisting of urea, formaldehyde, and melamine formaldehyde. This $TiO_2$ pigmented resinous composition is substantially photochemically inert when exposed to ultraviolet light.

---

Industrial applications of resins and in particular melamine formaldehyde, urea formaldehyde, phenol formaldehyde and the like are extensive, particularly in coating compositions and in molded articles. An especially wide application of these resins has been made in the field of laminates by which is meant products in which a resin acts not only as an adhesive to hold together layers or masses of such materials as wood, polymers, glass fiber and paper but also to impart strength and durability to the finished product. One of the most familiar applications of laminates is that of flat sheets used for counter tops, shelving and panelling. Colored laminates are increasingly popular and in general are produced by impregnating a resinous material with a coloring agent such as an opaque pigmentary material. A typical opaque pigment used for this purpose is titanium dioxide. However, while this pigmentary material is ideal as an opacifying agent it has been found that when this pigment is used in resinous materials, and in particular laminates, the latter will discolor when exposed to sunlight.

An object therefore of the present invention is to provide an improved photochemically inert $TiO_2$ pigmented-resinous material and a method for producing the same.

Another object of the invention is to provide a $TiO_2$ pigmented resinous material which is highly resistant to discoloration when exposed to sunlight.

A further object of the invention is to provide a light-stable $TiO_2$-opacified paper laminate.

A still further object of the invention is to provide an improved process for preparing a $TiO_2$-pigmented paper laminate which is highly resistant to discoloration when exposed to ultra-violet light.

These and other objects, features and advantages of the invention will be described in more detail in the specification which follows:

Broadly the instant invention contemplates an improved, photochemically inert $TiO_2$ pigmented resinous composition comprising a $TiO_2$ pigment, a resinous material selected from the group consisting of urea formaldehyde and melamine formaldehyde resin and an inorganic nitrate-containing compound, the amount of said inorganic nitrate-containing compound being from 0.1% to 5.0% calculated as nitric acid and based on the weight of said resin.

The invention further contemplates the production of a $TiO_2$ pigmented resinous material, said material being resistant to discoloration when exposed to ultra-violet light which comprises incorporating in the resinous material, i.e., either in a resin per se, or in a paper laminate, a $TiO_2$ pigment and an inorganic nitrate-containing compound, the latter being incorporated in the resinous material by: adding the inorganic nitrate-containing compound thereto; by adding the inorganic nitrate-containing compound to the $TiO_2$ pigment; or by adding the inorganic nitrate-containing compound to the paper pulp during manufacture of a paper for laminates.

With reference to the kind of resins or resinuous materials contemplated within the scope of the invention these include amine resins, i.e., urea formaldehyde and melamine formaldehyde resins, as well as materials treated with the aforesaid resins, as for example laminates, and in particular paper laminates.

Paper laminates are usually prepared by either of two methods, one of which comprises impregnating a finished paper with a slurry comprising the $TiO_2$ pigment and a resin in a solution of water and alcohol. After the impregnated paper has been dried a plurality of sheets of the impregnated paper are superimposed on kraft paper and formed into an opacified paper laminate by well-known hot pressing techniques.

As an alternative method of preparing a $TiO_2$ pigmented paper laminate the $TiO_2$ pigment may be added to the paper stock used in the manufacture of the paper. The finished pigmented paper is then impregnated with an alcohol-water solution of the resin and dried, after which a plurality of sheets of the pigmented, resin-impregnated paper are laminated by hot pressing techniques.

Pursuant to the objects of the instant invention it has been found that the inorganic nitrate-containing compound may be added to the paper laminate at any stage of the process, i.e., it may be added to the paper pulp during manufacture of the paper stock; it may be added to the resin solution for bonding the pigment containing papers; it may be added to the pigment-resin slurry used to impregnate the paper stock; or, if desired, the inorganic nitrate-containing compound may be added to the $TiO_2$ pigment.

In the description which follows the unexpected superiority of the instant invention is illustrated by comparing the results achieved using a nitrate treatment in conjunction with the resin and $TiO_2$ pigment mixture as against employing no nitrate compound. The latter, which is referred to hereafter as a control, was prepared as follows:

The $TiO_2$ pigment used in this control was a rutile $TiO_2$ which had been wet milled and coated with 2% $Al_2O_3$ as the hydrous oxide.

60 ml. of deionized water, 51 ml. of alcohol and 100 grams of melamine (or urea) formaldehyde resin were mixed together. To this mixture were added 25 grams of the $TiO_2$ pigment. Paper strips were then dipped into this resin-pigment slurry. The coated paper strips were removed from the slurry and the excess resin-pigment slurry removed. The coated paper strips were then cured at 115° C. for ten minutes. After curing the coated paper sheets were then stacked on six sheets of kraft paper and the stack was pressed at 1000 p.s.i. at a temperature of 300° F. The laminated paper panel was then tested for degradation and was found to have an ultraviolet light discoloration (U.V.D.) of 12.5%.

The discoloration test used is described as follows:

Discoloration test

In order to determine the degree of discoloration of paper laminates opacified with an oxide coated $TiO_2$ pigment prepared as hereinabove described a test was devised as a standard for measuring the discoloration of a pigmented paper laminate when exposed to ultraviolet light. This test was carried out using a Colormaster Multipurpose Colorimeter and a battery of 6 type RS reflector sunlamps. The latter were arranged circumferentially approximately 5 inches above the top of a turntable which was rotated at a speed of 3 revolutions per minute. The specimen laminates to be evaluated were first tested for blue, green and red reflectance values using the colorimeter. Thereafter the test laminates were placed on the turntable beneath the bank of sunlamps and rotated for a period of 4 hours. The temperature at the surface of the turntable was maintained between 65 and 80° C.

After exposure for the aforesaid length of time the blue, green and red reflectance values of the exposed laminates were determined. Using these two sets of readings the average total discoloration in percent is determined by the formula:

$$D = \frac{b+g+r}{3}$$

where D is the average percentage discoloration and $b$, $g$ and $r$ are the changes in blue, green and red readings in percentage after exposure.

Having described the preparation of $TiO_2$ pigmented paper laminates prepared by the use of $TiO_2$ pigment alone, i.e., without a nitrate-containing compound, the following examples are presented to show the vast improvement obtained by using a mixture which incorporates a nitrate-containing compound according to the process of the instant invention.

EXAMPLES 1–24

Using the procedure described above a series of laminates containing various amounts of different nitrate compounds were prepared by pressing at 1000 p.s.i. The laminates formed were tested for discoloration and in all cases the percent U.V.D. was greatly reduced using the nitrate compounds.

The operational details and results obtained are recorded along with the control pigment in Table I.

TABLE I.—DISCOLORATION OF PAPER LAMINATES PIGMENTED WITH $TiO_2$ COATED WITH 2% $Al_2O_3$

| Example Number | Nitrate addition agent—added to pigment-resin slurry calculated as 2.5% nitric acid for all compounds and based on the weight of the melamine resin | Percent discoloration (U.V.D.) |
|---|---|---|
| Control | (None) | 12.5 |
| 1 | Beryllium | 0.3 |
| 2 | Aluminum | 0.4 |
| 3 | Thorium | 0.5 |
| 4 | Calcium | 0.6 |
| 5 | Lead | 0.8 |
| 6 | Barium | 1.0 |
| 7 | Strontium | 1.2 |
| 8 | Zirconyl | 1.2 |
| 9 | Magnesium | 1.4 |
| 10 | Lithium | 1.6 |
| 11 | Neodymium | 1.6 |
| 12 | Chromium (ic) | 2.0 |
| 13 | Nitric Acid | 2.1 |
| 14 | Ammonium | 2.1 |
| 15 | Potassium | 2.5 |
| 16 | Cadmium | 2.8 |
| 17 | Copper (ic) | 3.2 |
| 18 | Nickel (ous) | 3.3 |
| 19 | Zinc | 3.5 |
| 20 | Sodium | 3.8 |
| 21 | Titanium | 4.4 |
| 22 | Iron (ous) | 4.5 |
| 23 | Cerium (ous) | 5.0 |
| 24 | Iron (ic) | 5.4 |

EXAMPLES 25–43

Using the same procedure but employing a chalk resistant $TiO_2$ pigment which contains 1% ZnO and is coated with 1% $TiO_2$, 1% $SiO_2$ and 2% $Al_2O_3$, a series of laminates was made at various pressures using melamine and urea formaldehyde resins. The operational details and results are recorded in Table II along with the control which contained no nitrate compound.

TABLE II.—DISCOLORATION OF PAPER LAMINATES PIGMENTED WITH $TiO_2$ CONTAINING 1% ZnO, 1% $TiO_2$, 1% $SiO_2$ and 2% $Al_2O_3$

| Example Number | Nitrate addition agent—added to pigment-resin slurries calculated as 1.5% nitric acid for all compounds and based on weight of the resin | Pressure, p.s.i. | Percent discoloration (U.V.D.) |
|---|---|---|---|
| Control | (None) (using melamine) | 100 | 11.9 |
| 25 | Mercury (ous) | 100 | 1.4 |
| 26 | Strontium | 100 | 1.8 |
| 27 | Chromium (ic) | 100 | 1.9 |
| 28 | Potassium | 100 | 1.9 |
| 29 | Neodymium | 100 | 2.1 |
| 30 | Magnesium | 100 | 2.2 |
| 31 | Lithium | 100 | 2.3 |
| 32 | Zirconyl | 100 | 2.4 |
| 33 | Silicon ($SiO_2+HNO_3+H_2O$) | 100 | 2.6 |
| 34 | Antimony ($Sb_2O_3+HNO_3+H_2O$) | 100 | 2.9 |
| 35 | Cadmium | 100 | 3.0 |
| 36 | Nitric acid | 100 | 3.0 |
| Control | (None) | 1,000 | 10.1 |
| 37 | Iron (ic) | 1,000 | 3.0 |
| 38 | Zinc | 1,000 | 3.2 |
| 39 | Nickel (ous) | 1,000 | 3.3 |
| 40 | Cerium (ous) | 1,000 | 3.5 |
| Control | (None) (using urea) | 1,000 | 6.6 |
| 41 | Bismuth (bismuth nitrate+$H_2O$) | 1,000 | 1.0 |
| 42 | Tungsten ($H_2WO_4+HNO_3+H_2O$) | 1,000 | 1.2 |
| 43 | Uranium | 1,000 | 3.4 |

EXAMPLES 44–47

In these examples various types of $TiO_2$ pigments were used in the paper laminates with and without the addition of nitrate compounds.

The pigments used in these examples were prepared by the vapor phase reaction of $TiCl_4$ with $O_2$ in the presence of 1% $AlCl_3$. The pigment used in Example 44 was coated with 6% $Al_2O_3$ and 2% $SiO_2$ while the pigment used in Example 45 was coated with 2% $Al_2O_3$ and 6% $SiO_2$ and in Example 46 the pigment was coated with 4% $Al_2O_3$ and 1% $SiO_2$. The pigment in Example 47 had no coating.

In all of these tests using melamine formaldehyde resin, the paper laminates were made with and without the nitrate addition at 1000 p.s.i. The nitrates were added to the pigment resin-slurries. The operational details and results are recorded in Table III below.

TABLE III

| Example Number | Percent $HNO_3$ used | Percent discoloration (U.V.D.) |
|---|---|---|
| Control | None | 6.3 |
| 44 | 0.25 | 0.6 |
| Control | None | 11.0 |
| 45 | 1.0 | 2.2 |
| Control | None | 5.0 |
| 46 | 0.25 | 0.5 |
| Control | None | 16.2 |
| 47 | 1.0 | 2.4 |

EXAMPLES 48–53

In these examples the pigment used was a calcined $TiO_2$ which was treated with 4% $Al_2O_3$ and 2% $SiO_2$ followed by calcination at 725° C. to partially dehydrate the $Al_2O_3$ and $SiO_2$. A detailed procedure of the preparation of this particular type of pigment is disclosed and claimed in my U.S. Patent No. 3,035,966.

Following the procedure described in the previous examples, laminates using various amounts of nitrates were prepared by pressing at 100 p.s.i. The operational details and results are recorded in Table IV as follows:

TABLE IV.—DISCOLORATION OF PAPER LAMINATES PIGMENTED WITH $TiO_2$ COATED WITH 4% $Al_2O_3$ AND 2% $SiO_2$ AND DEHYDRATED AT 725° C.

| Example Number | Nitrate addition agent—added to pigment-resin slurry calculated as nitric acid for all compounds and based on weight of the resin | Percent discoloration (U.V.D.) |
|---|---|---|
| Control | (None) | 2.9 |
| Melamine Resin: | | |
| 48 | 0.1% Nitric acid | 2.2 |
| 49 | 0.5% Nitric acid | 1.7 |
| 50 | 1.0% Nitric acid | 1.4 |
| Urea resin: | | |
| 51 | 0.5% Ammonium nitrate | 2.1 |
| 52 | 1.0% Ammonium nitrate | 1.2 |
| 53 | 0.5% Nitric acid | 0.3 |

EXAMPLES 54–62

In these examples the nitrate compound was added to the resin solution and the $TiO_2$ pigment was added to the paper pulp. Paper laminates were prepared from the two components. The results are recorded in Table V.

TABLE V.—DISCOLORATION OF PAPER LAMINATES PIGMENTED WITH $TiO_2$ COATED WITH 4% $Al_2O_3$ AND 2% $SiO_2$

| Example Number | Nitrate addition agent—added to resin solutions calculated as nitric acid for all compounds and based on the weight of the melamine resin | Pressure, p.s.i. | Percent discoloration (U.V.D.) |
|---|---|---|---|
| Control | (None) | 1,000 | 2.9 |
| 54 | 1.0% Nitric acid | 1,000 | 0.9 |
| 55 | 0.5% Aluminum | 1,000 | 0.3 |
| 56 | 0.5% Cadmium | 1,000 | 0.9 |
| 57 | 0.5% Zinc | 1,000 | 0.6 |
| 58 | 0.5% Cerium | 1,000 | 0.9 |
| 59 | 1.0% Nitric acid | 100 | 1.7 |
| 60 | do | 2,500 | 0.5 |
| 61 | 3.0% Aluminum | 1,000 | 0.3 |
| 62 | 3.0% Zinc | 1,000 | 1.6 |

EXAMPLES 63–64

In the foregoing examples the nitrate compounds were added (1) to the pigment-resin slurry or (2) to the resin solution. However, the invention also contemplates using a procedure wherein the nitrate-containing compound is added to the paper stock or paper pulp used in preparing the laminate papers. Using this procedure paper pulp was treated with the nitrate compound in solutions containing from 5 to 10 g.p.l. $HNO_3$ and then sheeted and dried.

The nitrate-containing papers were dipped into a pigment slurry containing melamine formaldehyde resin (100 g. of resin, 60 ml. water, 51 ml. of alcohol and 25 g. of the coated $TiO_2$ pigment) and allowed to soak for five seconds. The papers were then removed and the excess slurry drained off after which the coated paper strips were air dried and cured at 115° C. for five minutes.

Two pigmented paper strips were stacked upon the top of six kraft paper sheets and the whole pressed at 1000 p.s.i. for ten minutes at 300° F.

The laminates so formed were then tested for discoloration. As shown in Table VI below the laminates prepared from the nitrate-containing paper stock had low ultraviolet discoloration as compared to the control.

TABLE VI.—DISCOLORATION OF PAPER LAMINATES PIGMENTED WITH $TiO_2$ COATED WITH 4% $Al_2O_3$ AND 2% $SiO_2$

| Example Number | Addition agent—added to paper stock and based on weight of paper[1] | Percent discoloration (U.V.D.) |
|---|---|---|
| Control | (None) | 3.8 |
| 63 | 1.4% Nitric acid | 2.2 |
| 64 | 2.7% Nitric acid | 0.8 |

[1] Treatment equivalent to 0.14% and 0.27% $HNO_3$ respectively on resin basis when paper is soaked in resin mixture.

EXAMPLES 65–69

In addition to the above methods of incorporating the nitrate-containing compounds in resinous materials the invention also contemplates preparation of a rutile $TiO_2$ pigment having a coating of partially dehydrated alumina and silica in combination with a nitrate compound thereon and the incorporation of the resulting photochemically inert pigment in a resinous material.

To these ends an alumina-silica coated $TiO_2$ pigment prepared as described above may be dry blended with a nitrate compound or the latter, as an aqueous solution, may be added to the pigment.

Thus, an alumina-silica coated $TiO_2$ pigment was treated with 1.0 percent nitric acid by adding the latter, as 100 g.p.l. $HNO_3$ solution, to 100 grams of the pigment while chaser milling the pigment with no load. The treated pigment was dried at about 30° C.

Similarly an alumina-silica coated $TiO_2$ pigment was treated with ammonium nitrate, by adding the latter as 100 g.p.l. $NH_4NO_3$ solution, to 100 grams of the pigment while chaser milling the pigment under no load. The treated pigment was dried at 120° C.

Each of the foregoing treatments was repeated using an amount of $HNO_3$ and $NH_4NO_3$ respectively, corresponding to 0.5% on a $TiO_2$ weight basis.

In addition an alumina-silica coated $TiO_2$ pigment was dry blended with 1% sodium nitrate on a $TiO_2$ weight basis. The amount of nitric compound added to the pigment should be between 0.5% and 5% calculated as nitric acid.

These nitrate-treated photochemically inert $TiO_2$ pigments were then used in the preparation of melamine formaldehyde resin-pigmented paper laminates pressed at 100 p.s.i. in the manner hereinabove described and the laminates were tested for color degradation after exposure to ultraviolet light.

The test results are shown in Table VII below:

TABLE VII.—DISCOLORATION OF PAPER LAMINATES PIGMENTED WITH $TiO_2$ COATED WITH 4% $Al_2O_3$ and 2% $SiO_2$

| Example Number | Nitrate addition agent—added to treated pigment and based on weight of pigment[1] | Percent discoloration (U.V.D.) |
|---|---|---|
| Control | (None) | 4.1 |
| 65 | 1.0% Nitric acid | 2.0 |
| 66 | 1.0% Ammonium | 1.9 |
| 67 | 0.5% Nitric acid | 2.0 |
| 68 | 0.5% Ammonium | 2.7 |
| 69 | 1.0% Sodium | 1.3 |

[1] Equivalent to 0.125–0.25% on resin basis when pigment is in resin mixture.

EXAMPLES 70–71

In these examples molded placques were prepared by mixing the $TiO_2$ pigment described above with melamine formaldehyde and urea formaldehyde powders respectively in a blendor. Nitric acid and ammonium nitrate were added to these mixtures. These mixes were then pressed in a mold at 1000 p.s.i. at 290° F. for 10 minutes. These molded placques were then tested for discoloration and compared with compositions containing no nitrates. The results obtained are recorded in Table VIII.

TABLE VIII.—DISCOLORATION OF MOLDED COMPOSITIONS

| Example Number | Nitrate added | Resin | Percent discoloration (U.V.D.) |
|---|---|---|---|
| Control | None | Melamine | 4.0 |
| 70 | 1% $HNO_3$ | do | 0.9 |
| Control | None | Urea | 2.8 |
| 71 | 2% $NH_4NO_3$ | do | 1.5 |

From the above description and by the examples presented, it has clearly been shown that a resinous material pigmented with a $TiO_2$ pigment and containing an inorganic nitrate compound in an amount from 0.1% to 5.0%, calculated as nitric acid and based on the weight of the resin, effects an unexpected and surprisingly great improvement in the photochemical stability of the resinous material when exposed to ultra-violet light.

While this invention has been described and illustrated by the examples shown, it is not intended to be strictly limited thereto, and other variations and modifications may be employed within the scope of the following claims.

I claim:
1. In a $TiO_2$ opacified resin system in which the resin is selected from the group consisting of urea formaldehyde and melamine formaldehyde and the opacifying agent is a $TiO_2$ pigment, said system normally discoloring rapidly when said system is exposed to ultraviolet light, the improvement comprising an inorganic nitrate-containing compound incorporated in said system to render said system resistant to discoloration by ultraviolet light, the amount of said inorganic nitrate-containing compound incorporated into said system being from 0.1% to 5.0%, calculated as nitric acid and based on the weight of the resin.

2. A method for producing a $TiO_2$ pigmented-resinous material which is resistant to discoloration when exposed to ultraviolet light which comprises incorporating in the resinous material a TiO₂ pigment and an inorganic nitrate-containing compound, the amount of said inorganic nitrate-containing compound being from 0.1% to 5.0% calculated as nitric acid and based on the weight of the resin, said resinous material selected from the group consisting of urea formaldehyde and melamine formaldehyde resin.

3. In a method for producing a TiO₂ opacified resinous paper laminate, which normally discolors rapidly when exposed to ultraviolet light the improvement which comprises dipping paper strips into a TiO₂ pigment-resin mixture containing an inorganic nitrate compound, to form a laminate which is resistant to discoloration, the amount of said inorganic nitrate compound added to said mixture being from 0.1% to 5.0% calculated as HNO₃ and based on the weight of said resin, said resin selected from the group consisting of urea formaldehyde and melamine formaldehyde.

4. In a method for producing a TiO₂ opacified resinous paper laminate, which normally discolors rapidly when exposed to ultraviolet light, the improvement which comprises admixing the TiO₂ pigment and the paper pulp to form TiO₂ pigmented paper strips, and adding said pigmented paper strips to a resin containing an inorganic nitrate compound, to form a laminate resistant to discoloration the amount of said inorganic nitrate compound added being from 0.1% to 5.0% calculated as HNO₃ and based on the weight of said resin, said resin selected from the group consisting of urea formaldehyde and melamine formaldehyde.

References Cited

UNITED STATES PATENTS

| | | | |
|---|---|---|---|
| 3,210,321 | 10/1965 | Doyle et al. | 260—45.9 |
| 3,123,647 | 3/1964 | Duennenberger et al. | 260—45.9 |
| 2,193,559 | 3/1940 | Keats | 106—300 |
| 3,035,966 | 5/1962 | Siuta | 106—300 |
| 3,107,150 | 10/1963 | Angerman | 106—300 |

OTHER REFERENCES

Von Fischer: Organic Protective Coatings, Reinhold Publishing Corp., New York, 1953, p. 85.

Miles: Polymer Technology, Temple Press, London, 1965, p. 345.

MORRIS LIEBMAN, *Primary Examiner.*

R. BARON, *Assistant Examiner.*

U.S. Cl. X.R.

260—38, 45.75, 45.9; 117—155; 106—300, 308